US009550169B2

(12) United States Patent
Kadota

(10) Patent No.: US 9,550,169 B2
(45) Date of Patent: Jan. 24, 2017

(54) HONEYCOMB STRUCTURE BODY AND METHOD OF PRODUCING THE SAME

(71) Applicant: DENSO CORPORATION, Kariya, Aichi-pref. (JP)

(72) Inventor: Yoichi Kadota, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/847,284

(22) Filed: Sep. 8, 2015

(65) Prior Publication Data

US 2016/0067676 A1     Mar. 10, 2016

(30) Foreign Application Priority Data

Sep. 8, 2014    (JP) .................................. 2014-182493

(51) Int. Cl.
*B01J 23/10*     (2006.01)
*C04B 38/00*     (2006.01)
(Continued)

(52) U.S. Cl.
CPC ................. *B01J 23/10* (2013.01); *B01J 35/04* (2013.01); *B01J 37/0009* (2013.01); *C04B 35/50* (2013.01);
(Continued)

(58) Field of Classification Search
CPC ................ C04B 38/0006; C04B 35/50; C04B 2111/00793; C04B 2111/0081; B01J 23/10; B01J 37/0009; B01J 35/04; B01J 37/08; B01J 23/63; B01J 35/002; B01D 2255/407; B01D 53/9445; B01D 2255/2092; B01D 2255/102
See application file for complete search history.

(56) References Cited

U.S. PATENT DOCUMENTS

2005/0049137 A1    3/2005    Shikata et al.
2009/0247395 A1   10/2009    Kunieda et al.
(Continued)

FOREIGN PATENT DOCUMENTS

JP    2005-075659    3/2005
JP         4711014    4/2011
(Continued)

OTHER PUBLICATIONS

Nakatani, et al. "Preparation of CeO2—ZrO2 Mixed Oxide Powders by the Coprecipitation Method for the Purification Catalysts of Automotive Emission", Journal of Sol-Gel Science and Technology Jan. 2003, vol. 26, Issue 1-3, pp. 859-863.
(Continued)

*Primary Examiner* — Melvin C Mayes
*Assistant Examiner* — Michael Forrest
(74) *Attorney, Agent, or Firm* — Nixon & Vanderhye P.C.

(57) ABSTRACT

A honeycomb structure body has promoter particles made of ceria-zirconia solid solution, and inorganic binder particles made of alumina arranged between the promoter particles, and a cerium aluminate phase formed on a boundary surface between the promoter particles and the inorganic binder particles. Further, a method of producing the honeycomb structure body has at least first and second steps. The first step molds raw material to form a honeycomb molded body. The raw material has a mixture of promoter particles and a sol containing inorganic binder particles. The second step fires the honeycomb molded body in an atmosphere having an oxygen concentration of not more than 0.5 vol. % to produce the honeycomb structure body.

9 Claims, 4 Drawing Sheets

(51) Int. Cl.
*C04B 35/50* (2006.01)
*B01J 37/00* (2006.01)
*B01J 35/04* (2006.01)
*B01D 53/94* (2006.01)
*B01J 37/08* (2006.01)
*B01J 23/63* (2006.01)
*B01J 35/00* (2006.01)
*C04B 111/00* (2006.01)

(52) U.S. Cl.
CPC ....... *C04B 38/0006* (2013.01); *B01D 53/9445* (2013.01); *B01D 2255/102* (2013.01); *B01D 2255/2092* (2013.01); *B01D 2255/407* (2013.01); *B01J 23/63* (2013.01); *B01J 35/002* (2013.01); *B01J 37/08* (2013.01); *C04B 2111/0081* (2013.01); *C04B 2111/00793* (2013.01)

(56) References Cited

U.S. PATENT DOCUMENTS

2010/0221160 A1  9/2010  Adib et al.
2012/0004094 A1  1/2012  Takeshima et al.

FOREIGN PATENT DOCUMENTS

| JP | 2012-519067 | 8/2012 |
| JP | 5185837 | 1/2013 |
| WO | WO 2010/106693 | 9/2010 |

OTHER PUBLICATIONS

Leonov et al., "High Temperature Reactions Between Ce2O3 and Al2O3 and the Properties of the Cerium Aluminates Formed" Bulletin of the Academy of Sciences of the USSR, Division of Chemical, Science Nov. 1962, vol. 11, Issue 11, pp. 1819-1823.

HONEYCOMB STRUCTURE BODY AND METHOD OF PRODUCING THE SAME

CROSS-REFERENCE TO RELATED APPLICATION

This application is related to and claims priority from Japanese Patent Application No. 2014-182493 filed on Sep. 8, 2014, the contents of which are hereby incorporated by reference.

BACKGROUND OF THE INVENTION

1. Field of the Invention

The present invention relates to honeycomb structure bodies made of promoter particles and inorganic binder particles and a method of producing the honeycomb structure bodies.

2. Description of the Related Art

There are known honeycomb structure bodies made of cordierite or SiC, etc., capable of purifying exhaust gas emitted from an internal combustion engine of a motor vehicle. Specifically, an exhaust gas purification catalyst is supported in the honeycomb structure body. That is, inorganic binder particles forming the honeycomb structure body support a promoter (or co-catalyst) made of ceria zirconia solid solution and noble metal catalyst.

Recently, there has been proposed a honeycomb structure body made of promoter components, etc. However, because it is difficult to perform the process of compacting and forming a solid mass of promoter particles together, i.e. the sintering of the promoter particles together, the produced honeycomb structure body has a weak strength when the honeycomb structure body contains such promoter particles. In order to solve such a conventional problem, there has been proposed a honeycomb structure body made of ceria particles, a ceramic material and inorganic binder particles. This ceramic material has a low self-sintering properties as compared with that of the ceria particles. For example, a patent document, Japanese patent No. 5185837 discloses such a honeycomb structure body.

By the way, it is requested to have an increased amount of components other than ceria particles in order for the honeycomb structure body to have an adequate strength. However, in this case, the properties of the promoter would cause a possible problem of deteriorating the exhaust gas purification performance. As a result, it is difficult for the honeycomb structure body to obtain the benefits of using the promoter particles.

On the other hand, increasing of the amount of the promoter particles would cause the honeycomb structure body to decrease in the necessary strength.

SUMMARY

It is therefore desired to provide a honeycomb structure body and a method of producing the honeycomb structure body having a high strength even if a composition ratio of promoter particles increases.

An exemplary embodiment provides a honeycomb structure body having promoter particles, inorganic binder particles and a cerium aluminate phase. The promoter particles are made of ceria-zirconia solid solution. The inorganic binder particles are made of alumina arranged between the promoter particles. The cerium aluminate phase is formed on a boundary surface between the promoter particles and the inorganic binder particles.

Another exemplary embodiment provides a method of producing the honeycomb structure body having the structure previously described having a first step and a second step. The first step molds a raw material into a honeycomb molded body. The raw material contains a mixture of promoter particles and a sol which contains inorganic binder particles. The second step fires the honeycomb molded body in an atmosphere having an oxygen concentration of not more than 0.5 vol. % to produce the honeycomb structure body.

In the honeycomb structure body, a cerium aluminate phase is formed on a boundary surface between the promoter particles (co-catalyst particles) and the inorganic binder particles. This cerium aluminate phase provides a strong combination between the promoter particles and the inorganic binder particles. This makes it possible for the honeycomb structure body to have a high strength even if a composition ratio of the promoter particles increases, i.e., becomes high. Because of increasing the composition ratio of the inorganic binder particles in the raw material of the honeycomb structure body, it is possible for the honeycomb structure body to have an excellent promoter properties and improve the exhaust gas purification performance. That is, it is possible for the honeycomb structure body to have a high strength while maintaining its excellent performance of purifying exhaust gas emitted from an internal combustion engine.

Further, because the honeycomb structure body contains the promoter particles made of ceria-zirconia solid solution, it is not necessary for the honeycomb structure body to support the promoter particles. The honeycomb structure body itself acts as a promoter to noble metal catalyst.

It is possible for the method to produce the honeycomb structure body having the improved structure and excellent properties previously described. The method has at least a first step and second step. In particular, in the second step, the honeycomb molded body produced by the first step is fired under the atmosphere having an oxygen concentration of not more than 0.5 vol. %. Because the honeycomb molded body is fired in the low-concentration oxygen atmosphere, a partial reaction is generated on the boundary surface between ceria promoter particles and alumina inorganic binder particles, and as a result it is possible to produce the honeycomb structure body to have a high strength because the cerium aluminate phase is formed on the boundary surface between the promoter particles and the inorganic binder particles.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
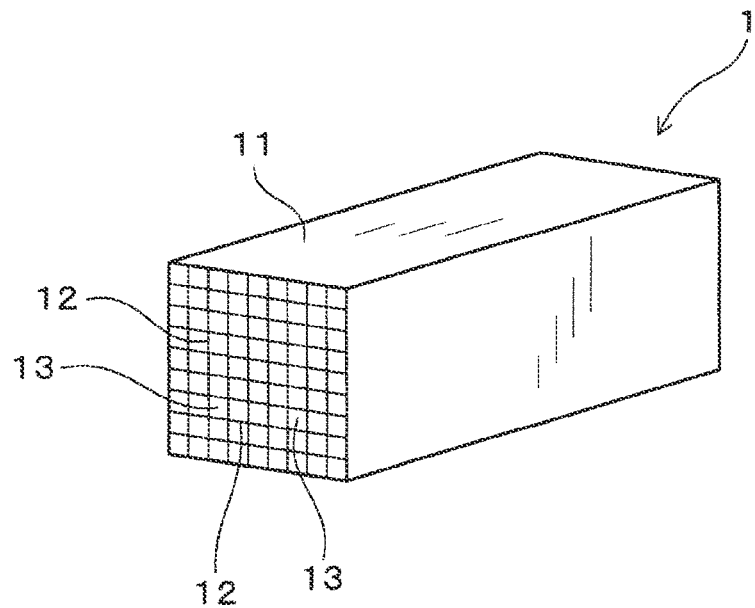
FIG. 1 is a perspective view showing a structure of a honeycomb structure body according to an exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

A description will be given of the honeycomb structure body and method according to a preferred exemplary embodiment.

The honeycomb structure body supports a three way catalyst which contains at least one noble metal, for example, selected from platinum (Pt), rhodium (Rh) and palladium (Pd). It is possible for the honeycomb structure body containing promoter particles (or co-catalyst particles) to enhance the catalyst performance of the three way catalyst when such three way catalyst is supported in the honeycomb structure body. The promoter particles are made of ceria-zirconium solid solution in which ceria particles ($CeO_2$) as promoter particles are contained in the zirconium particles, i.e. inserted between the zirconium particles, as inorganic binder particles to form the ceria-zirconium solid solution.

In the ceria-zirconia solid solution lanthanum particles (La), yttrium particles (Y), another rare earth element particles (REE) are contained into ceria particles. That is, in the ceria zirconia solid solution, zirconium particles are contained in ceria particles, i.e. inserted between ceria particles, and La or Y as rare earth elements are further contained in ceria particles, i.e. inserted between ceria particles, in addition to zirconium particles.

The cerium aluminate phase formed on the boundary surface between the promoter particles and the inorganic binder particles is formed as a reaction product between ceria in the promoter particles and alumina in the inorganic binder particles. A crystal lattice of the cerium aluminate phase present in this boundary surface between the promoter particles and the inorganic binder particles is distorted greater than that of the usual cerium-aluminate phase because of having a different lattice constant. That is, the ceria-zirconia solid solution, the cerium-aluminate, and the alumina have a different respective lattice constants, respectively. It is possible to detect such a lattice distortion of the crystal lattice of the cerium aluminate phase on the basis of a peak-shift phenomena obtained by performing a X-ray diffraction method.

Further, it is preferable for the honeycomb structure body to have a porosity within a preferable range of 40 to 60 vol. %. To adjust the porosity of the honeycomb structure body within this preferable range makes it possible to overall adequately strengthen the honeycomb structure body. In addition to this feature, this structure makes it possible to further reduce a heat capacity of the honeycomb structure body, and enhance the exhaust gas purification performance in warming-up operation of the internal combustion engine. For example, it is possible to change the porosity of the honeycomb structure body by adjusting an average particle size of the raw material, a composition ratio of the raw material, a firing condition such as a firing temperature, etc. It is also possible to detect the porosity of the composition ratio by using a mercury penetration method using a mercury porosimeter.

For example, the honeycomb structure body according to the present invention has porous partition walls and a plurality of cells. The porous partition walls are arranged in a lattice shape in the inside of the outer skin layer of the honeycomb structure body. The cells extend to an axial direction of the honeycomb structure body. Each of the cells is formed by the porous partition walls. That is, each of the cells is surrounded by the porous partition walls. It is possible for each of the cells in the honeycomb structure body to have a cross section perpendicular to the axial direction having a shape selected from a triangle shape, a square shape, a hexagonal shape, and an octagonal shape. It is also possible for each of the cells to have a cross section of a circular shape perpendicular to the axial direction of the honeycomb structure body.

It is possible for the honeycomb structure body according to the present invention to have a cylindrical shape having a circular cross section or a columnar shape having a polygonal cross section, for example. The honeycomb structure body is covered with the outer skin layer. It is therefore possible for the outer skin layer to have a cylindrical shape or a columnar shape in accordance with the overall shape of the honeycomb structure body. Further, it is possible to combine a plurality of the honeycomb structure bodies together through the outer skin layers thereof in order to produce an assembly of the honeycomb structure bodies.

The method of producing the honeycomb structure body performs at least a first step and a second step as previously described. In the first step, promoter particles and a sol are mixed together to make a mixture. The sol contains inorganic binder particles. A raw material contains the mixture is molded to form (or, extruded to mold) a honeycomb molded body. For example, the first step uses an alumina sol.

It is possible to adjust the composition ratio of the promoter particles and the inorganic binder particles. In order to have the excellent feature capable of strengthening the overall strength of the honeycomb structure body even if the composition ratio of the promoter particles increases in the honeycomb structure body, it is preferable for the inorganic binder particles to be not more than 15 parts by pts. mass to 100 pts. mass of the promoter particles. It is further preferable for the inorganic binder particles to be not more than 12 pts. mass to 100 pts. mass of the promoter particles.

When the content of the inorganic binder particles decreases, the amount in connection between the promoter particles having a weak binding force increases, and a connection between the promoter particles and the inorganic binder particles decreases, and as a result there is a possible problem of it being difficult to form an adequate amount of the cerium aluminate phase on the boundary surface. Still further, this increases the bonding of the promoter particles having a weak bonding force. Accordingly, it is preferable for the composition ratio of the inorganic binder particles to be not less than 5 pts. mass, and more preferable of not less than 8 pts. mass to the promoter particles of 100 pts. mass.

Still further, it is preferable for a particle size ratio of the inorganic binder particles to the promoter particles to be not more than 1/100, more preferable to be more than 1/500. This structure makes it possible for the inorganic binder particles to easily contain between or be replaced with the promoter particles, and as a result to more strengthen the overall strength of the honeycomb structure body.

The particle size ratio is a ratio D1/D2 between an average particle size D1 of the promoter particles and an average particle size D2 of the inorganic binder particles. Such an average particle size is a particle size of 50% of a volume integration value in the particle size distribution obtained by a laser diffraction and scattering method.

In the second step, the honeycomb molded body is fired under an atmosphere having an oxygen concentration of not more than 0.5 vol. %. When the oxygen concentration exceeds the 0.5 vol. %, there is a possible problem of it being difficult to form the cerium aluminate phase. It is preferable for the atmosphere to have the oxygen concentration of not more than 0.3 vol. % from the viewpoint of reliably forming the cerium aluminate phase. It is possible to adjust the firing temperature and the firing period of time. For example, it is preferable to perform the second step of firing the honeycomb molded body at a firing temperature within a range of 700 to 1200 ° C., for a period of time within a range of 2 to 50 hours.

Exemplary Embodiment

A description will now be given of the honeycomb structure body 1 according to the exemplary embodiment with reference to FIG. 1 to FIG. 6.

FIG. 1 is a perspective view showing a structure of the honeycomb structure body 1 according to the exemplary embodiment.

As shown in FIG. 1, the honeycomb structure body 1 has a rectangular prism shape having a side of 35 mm, a side of 35 mm, and a length of 130 mm (35 mm×35 mm×130 mm). The honeycomb structure body 1 is a porous body. The porous body has the outer skin layer 11 having a rectangle prism shape, cell walls 12 arranged in the lattice shape in the inside of the outer skin layer 11, and a plurality of cells 13. Each of the cells 13 is surrounded by the cell walls 12. The honeycomb structure body 1 has a porosity of 50%, and a cell density of 78 cells/cm$^2$ (500 cpsi), and a cell thickness of 125 μm.

For example, the honeycomb structure body 1 having the structure previously described is produced and used as follows.

A plurality of the honeycomb structure body 1 is produced, in which noble metal particles (catalyst) are supported. The outer skin layers 11 of the honeycomb structure bodies 1 are bonded together to produce an assembly (not shown) of the honeycomb structure bodies 1. A cylindrical part is extracted from the produced assembly of the honeycomb structure bodies 1. An outer skin layer is formed on the outer peripheral surface of the extracted cylindrical part of the assembly. The extracted cylindrical part of the assembly of the honeycomb structure bodies 1 with the outer skin layer is called a catalytic converter.

The catalytic converter is arranged in the inside of an exhaust gas passage communicated with an internal combustion engine. When exhaust gas emitted from the internal combustion engine flows in the exhaust gas passage, the catalytic converter purifies the exhaust gas.

It is also acceptable to use the single honeycomb structure body 1 as the catalytic converter.

Figure 2:
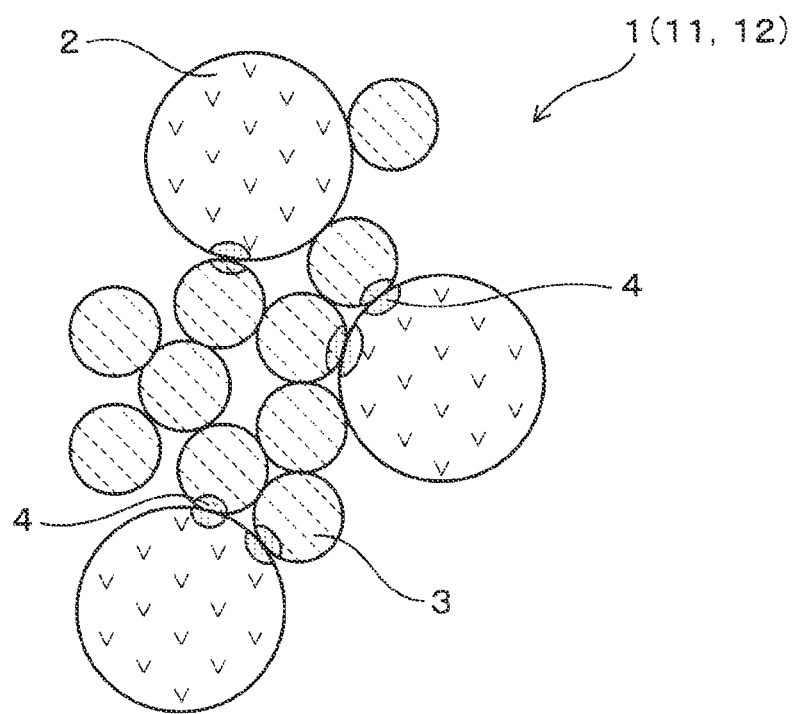
FIG. 2 is a view showing a partially enlarged cross section of the honeycomb structure body according to the exemplary embodiment of the present invention.

FIG. 2 is a view showing a partially enlarged cross section of the honeycomb structure body 1 according to the exemplary embodiment.

Specifically, as shown in FIG. 2, the outer skin layer 11 and the cell walls 12 are composed of a plurality of the promoter particles 2 and a plurality of the inorganic binder particles 3. The inorganic binder particles 3 are arranged, i.e. interposed between the promoter particles 2. The inorganic binder particles 3 are in contact with the adjacently arranged other inorganic binder particles 3 and/or the promoter particles 2. The inorganic binder particles 3 are fused to bond them together, and act as adhesion members. The promoter particles 2 are made of ceria zirconia solid solution. The inorganic binder particles 3 are made of alumina. A gap is formed between the promoter particles 2 and the inorganic binder particles 3 to form a porous structure. That is, the honeycomb structure body 1 is a porous body. Further, as shown in FIG. 2, the cerium aluminate phase 4 is formed between the promoter particle 2 and the inorganic binder particle 3. Ceria contained in the promoter particles 2 and alumina contained in the cerium aluminate phase 4 are partially reacted to form the cerium aluminate phase 4.

A description will now be given of the method of producing the honeycomb structure body 1 according to the exemplary embodiment with reference to FIG. 7.

Figure 7:
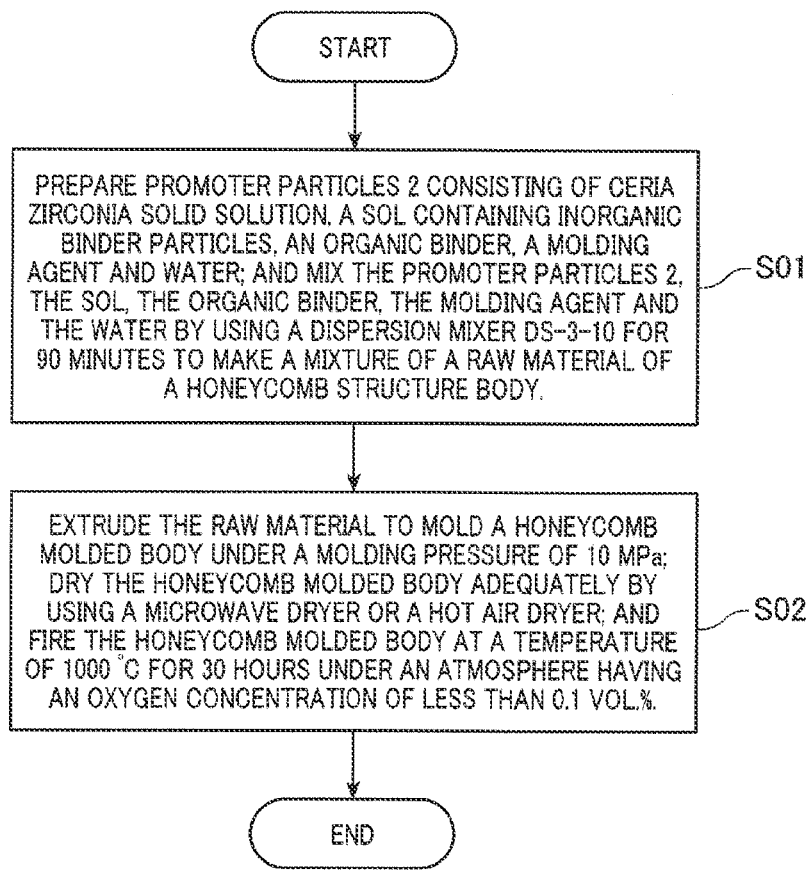
FIG. 7 is a view showing a flow chart for producing the honeycomb structure body 1 according to the exemplary embodiment.

FIG. 7 is a view showing a flow chart for producing the honeycomb structure body 1 according to the exemplary embodiment.

Specifically, in step S01 shown in FIG. 7, promoter particles 2 (average particle size: 12 μm) consisting of ceria zirconia solid solution, a sol containing inorganic binder particles (average particle size (primary particle size): 20 nm), an organic binder, a molding agent and water were prepared. The promoter particles 2, the sol containing inorganic binder particles, the organic binder, the molding agent and the water were mixed by using a dispersion mixer DS-3-10 (manufactured by Moriyama Company Ltd.) for 90 minutes to make a mixture of a raw material of the honeycomb structure body. The solid content of the sol containing the inorganic binder particles had 10 pts. mass to the promoter particles of 100 pts. mass. The organic binder had 15 pts. mass to the promoter particles of 100 pts. mass. The molding agent had 1 pts. mass to the promoter particles of 100 pts. mass. The water had 33 pts. mass to the promoter particles of 100 pts. mass. Alumina sol AS-520 (manufactured by Nissan Chemical Industries, Ltd.) was used as the sol containing the inorganic binder particles. Methyl cellulose 65MP4000 (manufactured by Matsumoto Yushi-Seiyaku Co. Ltd.) was used as the organic binder. UNILUB 50MB-26 (manufactured by NOF Corporation) was used as the molding agent. The promoter particles used in the exemplary embodiment is a ceria zirconia solid solution in which zirconium particles were contained in ceria particles, and La or Y as rare earth elements were further contained in ceria particles in addition to zirconium particles.

Next, in step S02 shown in FIG. 7, the raw material was extruded to mold the honeycomb molded body under the molding pressure of 10 MPa. After this, the honeycomb molded body was adequately dried by using a microwave dryer or a hot air dryer. After the drying step, the honeycomb molded body was fired at a temperature of 1000° C. for 30 hours under the atmosphere having an oxygen concentration of less than 0.1 vol. % (not more than the detection limit). This makes it possible to produce the honeycomb structure body 1 shown in FIG. 1 and FIG. 2. The other gas components other than oxygen in the atmosphere were nitrogen gas.

Figure 3:
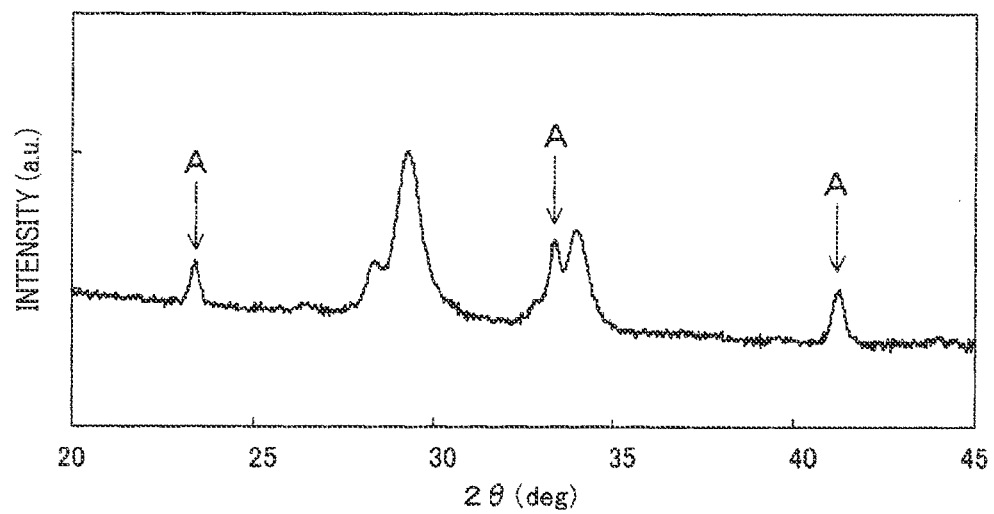
FIG. 3 is a view showing an X-ray diffraction pattern of the honeycomb structure body according to the exemplary embodiment of the present invention.

Next, a X ray diffraction pattern of the honeycomb structure body 1 according to the exemplary embodiment was detected Specifically, a part of the honeycomb structure body was pulverized to obtain pulverized powder of the honeycomb structure body. The X ray diffraction device was a SmartLab (manufactured by Rigaku Corporation). The X ray diffraction measurement used an X ray source of Cu-Kα, measurement range of 20 to 45°, a scanning width of 0.01°, an acceleration voltage of 40 kV, and a current of 30 mA. FIG. 3 shows the X ray diffraction result.

FIG. 3 is a view showing an X-ray diffraction pattern of ceramic material as the raw material forming the honeycomb structure body according to the exemplary embodiment.

As shown in FIG. 3, a peak caused by the presence of cerium aluminate solid solution and a peak caused by the presence of cerium aluminate were detected in the X ray diffraction pattern. That is, the peak caused by the cerium aluminate is designated by the arrow A in FIG. 3. Because the cerium aluminate has the a-axis lattice constant which is 3.77 Å, the cerium aluminate in the honeycomb structure body according to the exemplary embodiment is the a-axis lattice constant of 3.84 Å. That is, the honeycomb structure body 1 according to the exemplary embodiment has a distorted crystal lattice of the cerium aluminate. The reason why is that the ceria zirconia solid solution, the cerium aluminate, and the alumina have a different lattice constant, respectively, and the cerium aluminate is formed on the boundary surface between the promoter particles the ceria zirconia composed of ceria zirconia and the inorganic binder particles composed of alumina.

As previously described, the exemplary embodiment produced the honeycomb structure body 1 (see FIG. 1 and FIG. 2) having the inorganic binder particles 3 made of alumina and the cerium aluminate phase 4, and the cerium aluminate phase 4 formed on the boundary surface of the promoter particles 2 and the inorganic binder particles 3.

The exemplary embodiment produced honeycomb structure bodies under a different oxygen concentration during the firing step of the honeycomb molded bodies. The exemplary embodiment performed X ray diffraction of the produced honeycomb structure bodies in order to detect the presence of cerium aluminate phase in each of the produced honeycomb structure body. Table 1 shows the detection results regarding the generation (or formation) of cerium aluminate phase in each of the produced honeycomb structure body.

TABLE 1

| Oxygen concentration (vol. %) in atmosphere during Firing step | Generation of Cerium Aluminate |
|---|---|
| less than 0.1 | Generated |
| 0.5 | Generated |
| 1 | None |
| 2 | None |
| 10 | None |
| 20 | None |

As can be understood from the detection results in Table 1, it is possible to produce the honeycomb structure body having the cerium aluminate phase when the oxygen concentration during the firing step is not more than 0.5 vol. %. That is, the firing step under the atmosphere of a low oxygen concentration of not more than 0.5 vol. % makes it possible to generate and form the cerium aluminate phase on the boundary surface between ceria particles in the promoter particles and alumina particles in the inorganic binder particles which are partially reacted together in the honeycomb structure body.

Comparative Sample

A description will now be given of a honeycomb structure body 9 as a comparative sample without having cerium aluminate phase.

Figure 4:
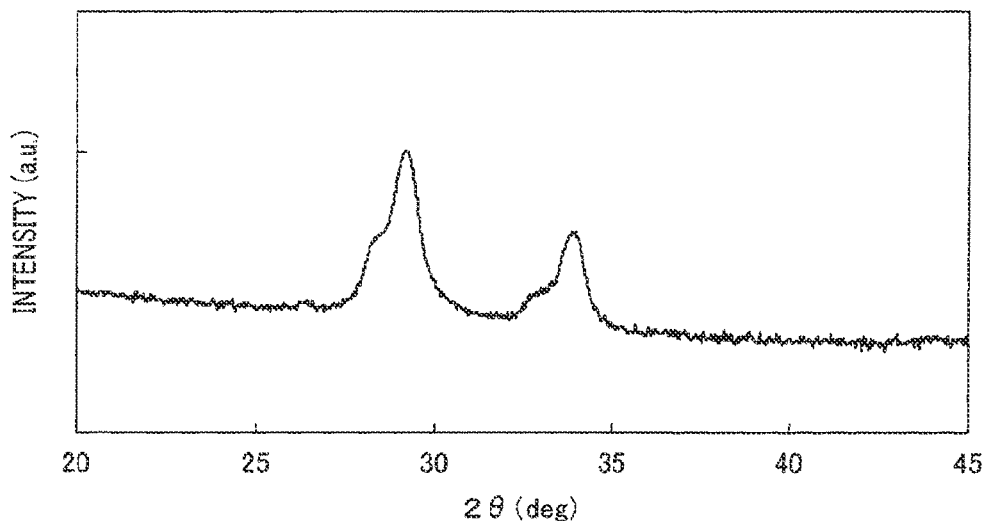
FIG. 4 a view showing an X-ray diffraction pattern of a comparative sample.
Figure 5:
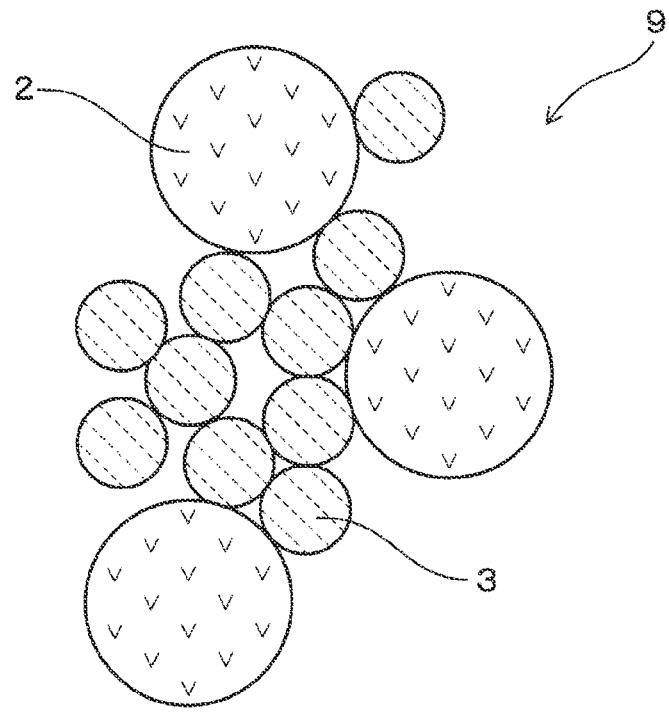
FIG. 5 is a view showing a partially enlarged cross section of the comparative sample.

FIG. 4 a view showing the X-ray diffraction pattern of the honeycomb structure body 9 as the comparative sample. FIG. 5 is a view showing a partially enlarged cross section of the honeycomb structure body 9 as the comparative sample.

Specifically, a raw material was prepared and a honeycomb molded body was produced by using the same steps of the exemplary embodiment previously described. Next, the honeycomb molded body was fired at a temperature of 1000° C. for 30 hours under an atmosphere of an oxygen concentration of 20 vol. % to produce the honeycomb structure body 9 the comparative sample. The atmosphere contains nitrogen gas in addition to oxygen gas.

Next, the produced honeycomb structure body 9 as the comparative sample was pulverized to obtain pulverized powder of the comparative sample by using the same procedure of the first exemplary embodiment previously described. The pulverized powder of the comparative sample was detected by using the X ray diffraction method in order to obtain a X ray diffraction pattern of the comparative sample.

As can be understood from the X-ray diffraction pattern of the comparative sample shown in FIG. 4, a peak caused by the presence of the ceria zirconia solid solution was detected, but no peak caused by the cerium aluminate phase.

That is, as shown in FIG. 5, the honeycomb structure body 9 as the comparative sample consists of the promoter particles 2 and the inorganic binder particles, and the inorganic binder particles 3 are entered between the promoter particles 2. However, no cerium aluminate phase is formed on the boundary surface between the promoter particles 2 and the inorganic binder particles 3.

(Comparison Between the Honeycomb Structure Body 1 according to the Exemplary Embodiment and the Honeycomb Structure Body 9 as the Comparative Sample)

A description will now be given of the comparison results in strength between the honeycomb structure body 1 according to the first exemplary embodiment and the honeycomb structure body 9 as the comparative sample with reference to FIG. 6.

Figure 6:
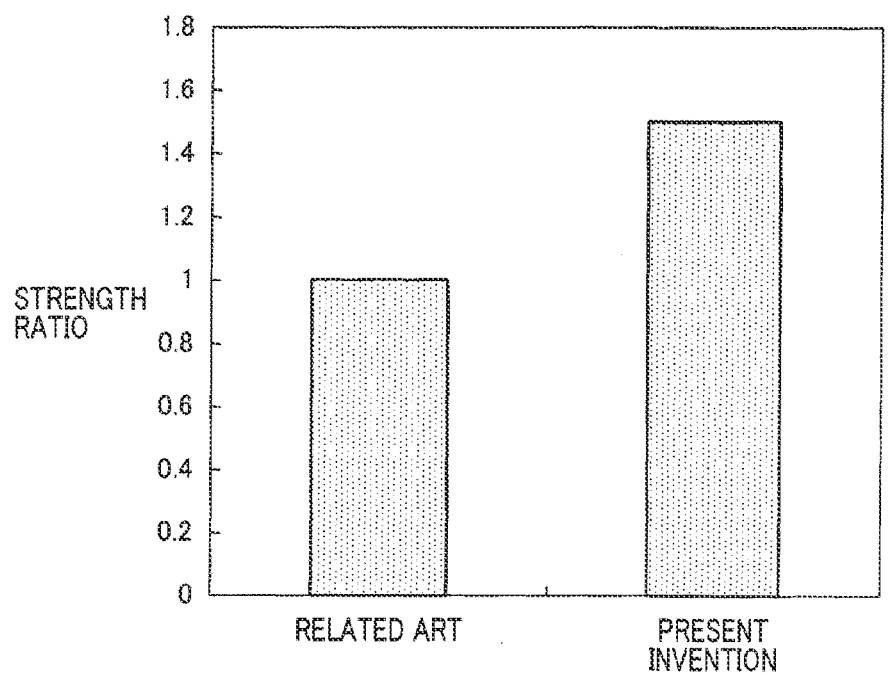
FIG. 6 is a view showing a comparison result in strength between the honeycomb structure body according to the exemplary embodiment of the present invention and the honeycomb structure body as the comparative sample.

FIG. 6 is a view showing the comparison results in strength between the honeycomb structure body 1 according to the exemplary embodiment of the present invention and the honeycomb structure body 9 as the comparative sample.

Specifically, a test piece having a length of 10 mm and containing a square section of three cells×three cells (3 cells×3 cells) was extracted from each of the honeycomb structure body 1 and the honeycomb structure body 9.

Next, a compressive load was supplied to each test piece in a longitudinal direction in order to detect a fracture load (L) of each test piece by using an AG-X Plus Autograph testing machine as an universal testing machine (manufactured by Shimadzu Corporation). Next, a strength (I) of each test piece was calculated on the basis of the fracture load (L) and the cross sectional area (S) of the test piece by using the following equation (1)

$$I(MPa) = L/S \qquad (1),$$

where S indicates a cross sectional area of the test piece, which is obtained by subtracting a cross sectional area of opening sections of cells from a cross sectional area in the longitudinal direction of the test piece.

Ten test pieces of each of the honeycomb structure body 1 and the honeycomb structure body 9 were prepared, and an average strength of the ten test pieces was calculated. FIG. 6 shows a comparison results in strength between the honeycomb structure body according to the exemplary embodiment and the honeycomb structure body 9 as the comparative sample.

As can be understood from the comparison results shown in FIG. 6, the honeycomb structure body 1 according to the exemplary embodiment has a strength of 1.5 times of the strength of the honeycomb structure body 9 as the comparative sample, where the honeycomb structure body 1 has the cerium aluminate phase 4 on the boundary surface between the promoter particles 2 and the inorganic binder particles 3 (see FIG. 2), and the honeycomb structure body 9 as the comparative sample does not have the cerium aluminate phase 4 (see FIG. 5).

That is, the honeycomb structure body 1 according to the exemplary embodiment has the cerium aluminate phase 4 formed on the boundary surface between the promoter particles 2 and the inorganic binder particles 3 capable of strengthening the bonding between the promoter particles 2 and the inorganic binder particles 3. This makes it possible to provide the honeycomb structure body 1 having a high strength even if the composition ratio of the promoter particles 2 increases.

Further, even if the composition ratio of the promoter particles 2 increases in the honeycomb structure body 1, it is possible to provide the honeycomb structure body having an excellent exhaust gas purification performance. That is, it is possible for the honeycomb structure body 1 to have a high strength while maintaining the excellent exhaust gas purification performance.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A honeycomb structure body comprising:
   promoter particles made of ceria-zirconia solid solution;
   inorganic binder particles made of alumina arranged between the promoter particles; and
   a cerium aluminate phase formed on a boundary surface between the promoter particles and the inorganic binder particles.

2. A method of producing a honeycomb structure body according to claim 1 comprising steps of:
   molding raw material into a honeycomb molded body, the raw material comprising a mixture of promoter particles and a sol which contains inorganic binder particles; and
   firing the honeycomb molded body in an atmosphere having an oxygen concentration of not more than 0.5 vol. % to produce the honeycomb structure body.

3. The method of producing a honeycomb structure body according to claim 2, wherein the inorganic binder particles has a composition ratio of not more than 15 pts. mass to 100 pts. mass of the promoter particles.

4. The method of producing a honeycomb structure body according to claim 2, wherein the inorganic binder particles has a composition ratio of not more than 12 pts. mass to 100 pts. mass of the promoter particles.

5. The method of producing a honeycomb structure body according to claim 2, wherein the inorganic binder particles has a composition ratio of not less than 5 pts. mass to 100 pts. mass of the promoter particles.

6. The method of producing a honeycomb structure body according to claim 2, wherein the inorganic binder particles has a composition ratio of not less than 8 pts. mass to 100 pts. mass of the promoter particles.

7. The method of producing a honeycomb structure body according to claim 2, wherein the inorganic binder particle has a particle size ratio of not more than 1/100 to the particle size of the promoter particle.

8. The method of producing a honeycomb structure body according to claim 2, wherein the inorganic binder particle has a particle size ratio of not more than 1/500 to the particle size of the promoter particle.

9. The method of producing a honeycomb structure body according to claim 2, wherein the honeycomb molded body is fired in the atmosphere having the oxygen concentration of not more than 0.3 vol. %, at a temperature within a range of 700 to 1200° C. within a range of 2 to 50 hours.

\* \* \* \* \*